United States Patent
Schubert et al.

(10) Patent No.: US 9,068,044 B2
(45) Date of Patent: Jun. 30, 2015

(54) ALKOXYLATION PRODUCTS AND PROCESS FOR PREPARING THEM BY MEANS OF DMC CATALYSTS

(75) Inventors: Frank Schubert, Neukirchen-Vluyn (DE); Wilfried Knott, Essen (DE)

(73) Assignee: Evonik Degussa GmbH, Essen (DE)

( * ) Notice: Subject to any disclaimer, the term of this patent is extended or adjusted under 35 U.S.C. 154(b) by 385 days.

(21) Appl. No.: 13/475,300

(22) Filed: May 18, 2012

(65) Prior Publication Data

US 2012/0296125 A1 Nov. 22, 2012

(30) Foreign Application Priority Data

May 18, 2011 (DE) .......................... 10 2011 076 019

(51) Int. Cl.
| | | |
|---|---|---|
| C07C 41/03 | (2006.01) | |
| C07C 43/178 | (2006.01) | |
| C08G 65/32 | (2006.01) | |
| C08G 65/12 | (2006.01) | |
| C08G 65/24 | (2006.01) | |
| C08G 65/26 | (2006.01) | |

(52) U.S. Cl.
CPC ................ C08G 65/32 (2013.01); C08G 65/12 (2013.01); C08G 65/24 (2013.01); C08G 65/2663 (2013.01)

(58) Field of Classification Search
CPC .... C08G 65/12; C08G 65/2663; C08G 65/32; C08G 65/24
USPC .................................................. 568/616, 614
See application file for complete search history.

(56) References Cited

U.S. PATENT DOCUMENTS

| | | | |
|---|---|---|---|
| 2,839,419 A * | 6/1958 | Windover et al. .......... 106/193.1 |
| 3,278,457 A | 10/1966 | Milgrom | |
| 3,278,458 A | 10/1966 | Belner et al. | |
| 3,278,459 A | 10/1966 | Herold et al. | |
| 3,427,256 A | 2/1969 | Milgrom | |
| 3,427,334 A | 2/1969 | Belner el al. | |
| 3,427,335 A | 2/1969 | Herold et al. | |
| 3,578,719 A | 5/1971 | Kalopissis et al. | |
| 3,840,606 A * | 10/1974 | Vanlerberghe ................ 568/618 |
| 5,118,448 A * | 6/1992 | Cooper .......................... 554/168 |
| 5,158,922 A | 10/1992 | Hinney et al. | |
| 5,159,092 A | 10/1992 | Leuteritz | |
| 5,371,161 A | 12/1994 | Knott et al. | |
| 5,430,166 A | 7/1995 | Klein et al. | |
| 5,430,167 A | 7/1995 | Klein et al. | |
| 5,455,367 A | 10/1995 | Klein et al. | |
| 5,470,813 A | 11/1995 | Le-Khac | |
| 5,475,127 A | 12/1995 | Klein et al. | |
| 5,482,908 A | 1/1996 | Le-Khac | |
| 5,856,548 A | 1/1999 | Droese et al. | |
| 5,934,579 A | 8/1999 | Hiersche et al. | |
| 5,981,812 A | 11/1999 | Eufinger et al. | |
| 6,255,511 B1 | 7/2001 | Klein et al. | |
| 6,291,622 B1 | 9/2001 | Droese et al. | |
| 6,307,082 B1 | 10/2001 | Klein et al. | |
| 6,489,498 B2 | 12/2002 | Klein et al. | |
| 6,858,663 B2 | 2/2005 | Knott et al. | |
| 7,018,458 B2 | 3/2006 | Knott et al. | |
| 7,125,585 B2 | 10/2006 | Dudzik et al. | |
| 7,157,541 B2 | 1/2007 | Knott et al. | |
| 7,176,264 B2 | 2/2007 | Pettersson et al. | |
| 7,196,153 B2 | 3/2007 | Burkhart et al. | |
| 7,423,112 B2 | 9/2008 | Adkins | |
| 7,598,334 B2 | 10/2009 | Ferenz et al. | |
| 7,612,158 B2 | 11/2009 | Burkhart et al. | |
| 7,612,159 B2 | 11/2009 | Burkhart et al. | |
| 7,619,035 B2 | 11/2009 | Henning et al. | |
| 7,645,848 B2 | 1/2010 | Knott et al. | |
| 7,754,778 B2 | 7/2010 | Knott et al. | |
| 7,825,205 B2 | 11/2010 | Knott et al. | |
| 7,825,206 B2 | 11/2010 | Neumann et al. | |
| 7,825,209 B2 | 11/2010 | Knott et al. | |
| 8,138,294 B2 | 3/2012 | Henning et al. | |
| 2002/0161158 A1 | 10/2002 | Burkhart et al. | |
| 2002/0182469 A1 | 12/2002 | Nishiura et al. | |
| 2003/0004378 A1 | 1/2003 | Ostrowski et al. | |
| 2003/0119663 A1 | 6/2003 | Ooms et al. | |
| 2007/0128143 A1 | 6/2007 | Gruening et al. | |
| 2007/0185353 A1 | 8/2007 | Snell et al. | |
| 2009/0137751 A1 | 5/2009 | Knott et al. | |
| 2009/0137752 A1 | 5/2009 | Knott et al. | |
| 2010/0022435 A1 | 1/2010 | Henning et al. | |
| 2010/0041910 A1 | 2/2010 | Schubert et al. | |
| 2010/0071849 A1 | 3/2010 | Knott et al. | |
| 2010/0081781 A1 | 4/2010 | Schubert et al. | |
| 2010/0105843 A1 | 4/2010 | Knott et al. | |

(Continued)

FOREIGN PATENT DOCUMENTS

| | | |
|---|---|---|
| DE | 102004007561 | 10/2005 |
| DE | 102006031152 | 1/2008 |

(Continued)

OTHER PUBLICATIONS

"Dictionary of Natural Products", Chapman and Hall/CRC Press, Taylor and Francis Group, e.g. in the online version of 2011: http://dnp.chemnetbase.com/, 1 page.

*Primary Examiner* — Rosalynd Keys

(74) *Attorney, Agent, or Firm* — Frommer Lawrence & Haug LLP

(57) ABSTRACT

Novel alkoxylation products containing lateral hydroxyl groups or bearing lateral C—C double bonds and a process for preparing them by means of an alkoxylation reaction of halogenated alkylene oxides using double metal cyanide (DMC) catalysts and subsequent elimination of chlorine.

14 Claims, No Drawings

(56) References Cited

U.S. PATENT DOCUMENTS

| | | |
|---|---|---|
| 2010/0113633 A1 | 5/2010 | Henning et al. |
| 2010/0168367 A1 | 7/2010 | Schubert et al. |
| 2010/0184913 A1 | 7/2010 | Ebbrecht et al. |
| 2010/0249339 A1 | 9/2010 | Henning et al. |
| 2010/0266518 A1 | 10/2010 | Springer et al. |
| 2010/0292357 A1 | 11/2010 | Knott et al. |
| 2010/0298455 A1 | 11/2010 | Henning et al. |
| 2011/0021693 A1 | 1/2011 | Henning et al. |
| 2011/0034576 A1 | 2/2011 | Henning et al. |
| 2011/0042004 A1 | 2/2011 | Schubert et al. |
| 2011/0046305 A1 | 2/2011 | Schubert et al. |
| 2011/0172373 A1 | 7/2011 | Knott et al. |
| 2011/0185947 A1 | 8/2011 | Jaunky et al. |
| 2011/0230619 A1 | 9/2011 | Kuppert et al. |
| 2011/0230633 A1 | 9/2011 | Ferenz et al. |
| 2011/0245412 A1 | 10/2011 | Schubert et al. |
| 2011/0281973 A1 | 11/2011 | Schubert et al. |
| 2011/0301254 A1 | 12/2011 | Knott et al. |
| 2012/0010302 A1 | 1/2012 | Hartung et al. |
| 2012/0027704 A1 | 2/2012 | Henning et al. |
| 2012/0028022 A1 | 2/2012 | Brugger et al. |
| 2012/0029090 A1 | 2/2012 | Brugger et al. |
| 2012/0037036 A1 | 2/2012 | Veit et al. |
| 2012/0046486 A1 | 2/2012 | Henning et al. |
| 2012/0067520 A1 | 3/2012 | Schubert et al. |
| 2012/0068110 A1 | 3/2012 | Schubert et al. |
| 2012/0071564 A1 | 3/2012 | De Gans et al. |

FOREIGN PATENT DOCUMENTS

| | | |
|---|---|---|
| DE | 102008032066 | 1/2010 |
| EP | 0116978 | 8/1984 |
| EP | 0419419 | 3/1991 |
| EP | 1249464 | 10/2002 |
| GB | 1267259 | 3/1972 |
| GB | 1516195 | 6/1978 |
| WO | WO 00/37532 | 6/2000 |
| WO | WO 01/62826 | 8/2001 |
| WO | WO 01/80994 | 11/2001 |

* cited by examiner

ALKOXYLATION PRODUCTS AND PROCESS FOR PREPARING THEM BY MEANS OF DMC CATALYSTS

The present application claims priority from German Patent Application No. DE 10 2011 076 019.9 filed on May 18, 2011, the disclosure of which is incorporated herein by reference in its entirety.

BACKGROUND OF THE INVENTION

The invention relates to novel alkoxylation products containing lateral hydroxyl groups or bearing lateral C—C double bonds or corresponding polyethers and a process for preparing them by means of an alkoxylation reaction using double metal cyanide (DMC) catalysts.

The novel alkoxylation products containing lateral hydroxyl groups or bearing lateral C—C double bonds in question are, in particular, polyether alcohols, often also referred to as polyethers or polyetherols for short. Polyethers or polyetherols have been known for a long time and are produced in large quantities. They are employed, inter alia, for reaction with polyisocyanates as starting compounds for producing polyurethanes or else for the preparation of surfactants.

It is noted that citation or identification of any document in this application is not an admission that such document is available as prior art to the present invention.

Typically, a hydroxy-functional starter such as butanol, allyl alcohol, propylene glycol or glycerol is reacted in the presence of a suitable catalyst with alkylene oxides such as ethylene oxide, propylene oxide or butylene oxide in an alkoxylation reaction to give an alkoxylation product or polyether. Most processes for preparing such alkoxylation products employ basic catalysts such as alkali metal hydroxides and/or alkali metal methoxides. The use of KOH is particularly widespread. However, it is not always possible to use alkaline catalysis, e.g. in the presence of base-labile functional groups in the starting materials. Thus, for example, the alkoxylation of epihalohydrins using alkali metal hydroxides or alkali metal methoxides is not practicable.

Processes for acid catalysis using $HBF_4$ and Lewis acids such as $BF_3$, $AlCl_3$ and $SnCl_4$ in the alkoxylation have therefore been developed; as described, for example, in DE 10 2004 007 561 (US 2007/0185353). A disadvantage of the acid-catalysed polyether synthesis is the lack of regioselectivity in the ring opening of unsymmetrical oxiranes such as propylene oxide and epichlorohydrin, which leads to polyoxyalkylene chains having some secondary and primary OH end groups being obtained in an uncontrollable manner. The achievable molar masses of the polyethers are also relatively low compared to other catalysts as a result of chain terminations and secondary reactions.

Double metal cyanide (DMC) catalysts have been increasingly used in recent years as catalysts for preparing polyethers. The DMC-catalysed alkoxylation proceeds very selectively and rapidly and allows the preparation of polyethers having high molar masses and a comparatively low polydispersity The preparation and use of double metal cyanide complexes as alkoxylation catalysts has been known since the 1960s and is disclosed, for example, in U.S. Pat. Nos. 3,427,256, 3,427,334, 3,427,335, 3,278,457, 3,278,458, 3,278,459. Among the evermore effective types of DMC catalysts developed in subsequent years and described, for example, in U.S. Pat. Nos. 5,470,813 and 5,482,908 are, in particular, zinc-cobalt hexacyano complexes. Thanks to their extraordinarily high activity, only low catalyst concentrations are required for the preparation of polyethers.

Polyethers prepared from an OH-functional starter are widespread. The polyethers obtained therefrom have terminal OH groups. Thus, for example, polyethers having one, two or three hydroxyl groups along the chain are formed when using butanol, hexanediol or glycerol. The OH functionality of the polyether, which results automatically from the number of OH groups of the starter, is an important property feature which determines the possible uses of each polyether. Polyethers which are to be crosslinked by means of isocyanates in the synthesis of polyurethanes usually have two, three or more terminal OH functions. The OH functionality determines the crosslinking density and thus decisively determines the materials properties of the final crosslinked material.

In polyethers which are used as nonionic surfactants and emulsifiers, the OH groups act as strongly hydrophilic structural units. They usually form the chain end of polyethers which are obtained by addition of, for example, ethylene oxide on to fatty alcohols. The number and arrangement of the hydroxyl groups in the molecule very critically determines the hydrophile-lipophilie balance in the case of surface-active substances.

The industrially practicable possibilities for obtaining polyethers having a high OH functionality, in particular those having high molecular weights, are limited. Alkoxylation products or polyethers have molar mass distributions. When average molar masses are referred to below, these are the mass averages $M_w$. Thus, the synthesis of polyethers having four, six or more OH end groups starts out from starters such as pentaerythritol, sorbitol, dipentaerythritol or, for example, sugars or sugar alcohols, which, owing to their high melting points and their poor solubilities in inert solvents are difficult to alkoxylate.

Various documents describe preparing polyhydroxylated polyethers by use of glycidol, glyceryl carbonate and hydroxyoxetanes as monomers or comonomers in addition to other alkylene oxides. In all these processes, branched polyether structures are formed. Such products are frequently referred to as hyperbranched or dendritic polyethers. The incorporation of glycidol, glyceryl carbonate (after elimination of $CO_2$) and hydroxyoxetanes leads, after ring opening, to formation of an additional OH group on which new OH-terminated polyether side chains grow as further monomer is supplied. Each molecule of glycidol, glyceryl carbonate and hydroxyoxetane incorporated into the monomer thus automatically represents a branching point However, the OH-functional monomers at the same time function as chain starters for the monomers subsequently added, so that the end products are complex mixtures of polyethers which have different branching and a broad molar mass distribution. The OH functions are always present on the end groups of the main and side chains but never laterally in the middle of such a chain.

The (co)polymerization of glycidol under alkali-catalysed conditions to form highly branched polyetherols for polyurethane applications is described, for example, in WO 2000/037532. The preparation of polyhydroxylated polyethers having a dendritic structure from ethylene oxide, propylene oxide and glycidol is described by Feng et al. in Macromolecules (2009), 42 (19), 7292-7298. In J. Appl. Polym. Sci. (2001), 82(9), 2290-2299 Royappa et al. studied the cationic copolymerization of glycidol with various other epoxy compounds to form hyperbranched amphiphilic polyethers. EP 0 116 978 describes branched polyetherols having linear structural segments generated by KOH-catalysed reaction of polyethylene glycol with glycidol and ethylene oxide. EP 1 249

464 (US 2002/0182469) describes polyethers which are based on ethylene oxide and glycidol and have structural elements of the type [—CH$_2$—CH(CH$_2$O—)—O—] in addition to ethylenoxy units. The description and the examples indicate that this structural feature represents a branching point in the polyether skeleton and the products are thus hyperbranched polymers in which the lateral function is again a starting point for further alkoxylation steps or else bears an alkyl group.

DE 10 2008 032066 (US 2011/0185947) highlights poly-OH-functional allyl polyethers obtained by alkali-catalysed alkoxylation of glycidol or glyceryl carbonate with other alkylene oxides. The unsaturated polyethers which can be obtained in this way are reacted with hydrogensiloxanes in a hydrosilylation reaction to form highly OH-functional polysiloxane-polyether copolymers which have an antiadhesive, dirt-repelling action in coatings.

With regard to storage stability and toxicology, the use of hydroxy-functional oxetanes as monomers for generating OH groups and at the same time branching points has a significant advantage over glycidol. Thus, U.S. Pat. No. 7,176,264 describes a process for preparing dendritic polymers based on 3-ethyl-3-hydroxymethyloxetane. DE 10 2006 031 152 discloses branched polyhydroxy-functional allyl polyethers obtained by use of hydroxyoxetane in an alkoxylation reaction. Such copolymers with hydrogensiloxanes are employed in polar, usually aqueous surface coating systems.

Halogen-substituted polyethers obtained using DMC catalysts and epihalohydrins are known from U.S. Pat. No. 7,423,112. The halogenated polyethers described therein are converted into amine-functional polyethers in a further substitution reaction with amines.

Only few chemical processes which allow additional OH groups to be generated laterally and not only terminally in a polyether chain and thus avoid the formation of branched polymer structures have hitherto been described. Thus, U.S. Pat. No. 3,578,719 described polyhydroxylated surfactants for cosmetic applications which are obtained in a two-stage process from fatty alcohol starters having 8-22 carbon atoms by 1-10 mol of epichlorohydrin firstly being added on in an acid-catalysed alkoxylation reaction before, in the second step, the organically bound chlorine is converted into lateral OH groups in a substitution reaction in the presence of alkali metal carboxylates and polar solvents. The short-chain polyethers containing up to ten elements of the type [—CH$_2$—CH(CH$_2$OH)—O—] have an additional terminal OH group based on the monofunctional starter alcohol. BF$_3$, SnCl$_4$ and SbCl$_5$ serve as catalyst for the polyaddition of epichlorohydrin. A disadvantage is that only homopolymers of epichlorohydrin and hydroxylated downstream products thereof having low molar masses can be obtained by the abovementioned route. A very large amount, based on the product yield, of alkali metal chloride is formed and, as salt, is difficult to separate off. The formation of the very OH-rich end products requires not only high temperatures of 180° C. but also the use of polar, protic, high-boiling solvents such as dipropylene glycol in order to achieve quantitative elimination of chlorine. The solvent can subsequently be removed by distillation only with difficulty because of its high boiling point. In addition, it can be only partly recycled since it is partly esterified.

GB 1267259 and GB 1516195 describe the preparation of polyethers having [—CH$_2$—CH(CH$_2$OH)—O—] structural units as cosmetic oils by the use of tert-butyl glycidyl ether as monomer in a base-catalysed or Lewis acid-catalysed alkoxylation reaction. The process allows up to ten units of tort-butyl glycidyl ether to be added on in a block-like fashion per OH group of the starter alcohol. The tert-butyl groups are subsequently split off in the form of isobutylene in the presence of strong acids and the hydroxyl groups are thus formed. Chemically, tert-butyl glycidyl ether is an etherified glycidol. Since the OH group is protected, undesirable chain branches in the polymer structure are prevented. Likewise, the protected glycidol cannot function as chain starter because of the lack of an OH function. A disadvantage of the process is the restriction imposed by the unselective catalysis to products having relatively low molar masses and to structures having not more than ten [—CH$_2$—CH(CH$_2$OH)—O—] units, which are, in addition, exclusively bound in a block-like fashion.

Apart from the hydroxy functionalization, the functionalization by unsaturated groups plays an important role. A person skilled in the art will know of numerous methods of integrating C—C double bonds into polyethers. Polyethers which bear allyl groups and can be prepared, for example, from allyl alcohol, glyceryl monoallyl or diallyl ether or, for example, pentaerythritol monoallyl, diallyl or triallyl ether by a subsequent alkoxylation reaction are particularly widespread. The use of allyl glycidyl ether as monomer in the alkoxylation reaction is likewise known. Further structures bear alkenyl groups and are obtained, for example, by alkoxylation of vinyl oxyalcohols or unsaturated alcohols such as hexenol. Acrylate- and methacrylate-functionalized polyethers are also known and can be prepared, for example, by esterification of OH-functional polyethers with the respective unsaturated acid or by use of glycidyl (meth)acrylate as monomer in the alkoxylation.

The possible uses of unsaturated alkoxylation products such as polyethers are very versatile because of their reactivity and likewise known to those skilled in the art. Apart from the formation of polyether siloxanes by means of a hydrosilylation reaction, free-radical, ionic or radiation-induced curing plays an important role.

There is a lack of a process which allows both polyethers having multiple hydroxy functionality and those having unsaturated groups to be prepared, with the number of hydroxyl groups formed and the unsaturated groups in the molecule being able to be controlled by simple variation of the process conditions.

There is also a lack of hydroxy-functional alkoxylation products or polyethers which are neither dendritic nor hyperbranched in nature but whose structure is characterized by linear polyoxyalkylene chains having [—CH$_2$—CH(CH$_2$OH)—O—] units which are, as desired, incorporated randomly or in blocks and also of a process which allows such hydroxylated compounds to be prepared economically and reproducibly, with high molar masses and in a great structural variety, without the secondary and chain termination reactions known from acid or alkaline catalysis occurring in the alkoxylation. There is also a lack of unsaturated polyethers which bear units of the type [—CH$_2$—(=CH$_2$)—O—] which are distributed, as desired, either randomly or in blocks in the molecular chain, and also of a process for preparing them. There is also a lack of polyethers which bear both OH-functional [—CH$_2$—CH(CH$_2$OH)—O—] units and unsaturated vinyl ether units of the type [—CH$_2$—C(=CH$_2$)—O—] in the same molecular chain, and also of a process which enables such doubly functionalized alkoxylation products to be prepared in a simple, reproducible way.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in US. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product

SUMMARY OF THE INVENTION

It is therefore an object of the present invention to discover novel functional alkoxylation products having linear polyoxyalkylene chains which contain, as desired, [—$CH_2$—$CH$($CH_2OH$)—O—] units, [—$CH_2$—$C$(=$CH_2$—O—] units or both types of these functional groups in any desired ratio in the same molecular chain and also a process for preparing them.

This object is achieved by reaction of halogenated compounds bearing epoxide groups with starter alcohols in the presence of double metal cyanide (DMC) catalysts and subsequent substitution or elimination of the halogen.

Accordingly, it has surprisingly been found that such alkoxylation products bearing lateral hydroxyl groups and/or lateral vinyl groups can be obtained in a two-stage reaction in which a chlorinated alkoxylation product having the molar mass of the desired target product is firstly prepared from any desired OH-functional starter compound by means of selective double metal cyanide (DMC) catalysis in an alkoxylation reaction using epichlorohydrin as comonomer in addition to further alkylene oxides and is, in the second step of the synthesis, converted by boiling with alkaline hydroxides with substitution of chlorine or with dehydrochlorination into the desired laterally functionalized alkoxylation product bearing lateral hydroxyl groups or lateral C—C double bonds.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

The invention accordingly provides compounds according to the invention (hereinafter also referred to as alkoxylation products of the invention or polyethers of the invention) having the formula (I),

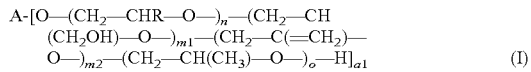

where R, a1, n, m1, m2 and o are as defined below, which have the structural unit [—$CH_2$—$CH(CH_2OH)$—O—] and/or the structural unit [—$CH_2$—$C$(=$CH_2$)—O—].

The invention further provides a process by means of which the alkoxylation products of the formula (I) can be obtained and also compositions comprising the alkoxylation products of the invention.

The process of the invention has the advantage that it makes it possible for the first time to obtain compounds of the formula (I).

The compounds of the invention having the formula (I) can be used as chemical intermediates for a large number of possible chemical reactions.

The alkoxylation products of the invention and their preparation are described by way of example below without the invention being restricted to these illustrative embodiments. Where ranges, general formulae or classes of compounds are indicated below, these are intended to encompass not only the corresponding ranges or groups of compounds which are explicitly mentioned but also all subranges and subgroups of compounds which can be obtained by leaving out individual values (ranges) or compounds. Where documents are cited in the present description, the contents thereof are fully incorporated by reference into the disclosure content of the present invention. Where percentages are reported below, these are, unless indicated otherwise, per cent by weight. In the case of compositions, the percentages are, unless indicated otherwise, based on the total composition. Where averages are indicated below, these are, unless indicated otherwise, mass averages (weight averages). Where measured values are indicated below, these measured values are determined, unless indicated otherwise, at a pressure of 101 325 Pa and a temperature of 23° C.

The alkoxylation products of the invention are characterized in that they have the formula (I),

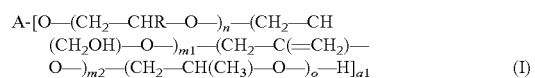

where

A is either hydrogen or an organic radical of an organic starter compound and in this case is a radical having at least one carbon atom, the radicals R are each, independently of one another, either hydrogen, $CH_2$—Cl, an alkyl group having 2-18 carbon atoms or an aromatic radical, in particular a phenyl radical, a1 is from 1 to 8, preferably from 1 to 4, (a1*$m_1$) is from 0 to 50, preferably from 0 to 30, particularly preferably from 1 to 20, (a1*$m_2$) is from 0 to 50, preferably from 1 to 30, particularly preferably from 2 to 20, and the sum (a1*($m_1$+$m_2$)) is from 2 to 50, preferably from 2 to 40, particularly preferably from 3 to 25, with the proviso that (a1*$m_1$) is equal to 2 or greater than 2 when $m_2$ is zero, (a1*n) is from 0 to 200, preferably from 0 to 150, particularly preferably from 0 to 100, (a1*o) is from 1 to 1000, preferably from 5 to 800, more preferably from 8 to 500 and particularly preferably from 10 to 400.

The units having the indices n, $m_1$, $m_2$ and o can, as desired, be present as a random mixture or blocks in the chain.

The indices indicated here and the value ranges of the indicated indices are for the present purposes averages of the possible random distribution of the structures actually present and/or the mixtures thereof. This also applies to those structural formulae which are shown in exact terms, for example formula (I).

The radical R is preferably H, CH$_2$—Cl, ethyl or phenyl, preferably exclusively H. Preferred compounds of the formula (I) have, in particular, no radicals R which contain a halogen.

The alkoxylation products of the invention can be functionalized by vinyl and/or hydroxyl groups to a different extent The molar proportion of units having the index m$_2$ is preferably from 20 to 100%, preferably from 30 to 90%, based on the sum of the units having the indices m$_1$ and m$_2$ which adds up to 100%.

The compounds of the invention having the formula (I) have a weight average molar mass of from 200 to 50 000 g/mol, preferably from 800 to 35 000 g/mol and particularly preferably from 1200 to 25 000 g/mol.

The alkoxylation products of the invention having the formula (I) differ from the compounds disclosed in EP 1 249 464 by the presence of oxypropylene units since the index o is always one or greater than one. Particular preference is given to alkoxylation products of the formula (I) which have an oxypropylene group as last monomer unit added on during the alkoxylation. In contrast, EP 1 249 464 A1 encompasses only alkoxylation products which have at least one oxyethylene unit and can be obtained by the use of ethylene oxide as monomer or by the use of, for example, ethylene glycol as starter compound. The products of the invention having the formula (I) do not necessarily have to contain ethylenoxy groups and the index n can be zero when R is hydrogen. hi addition, the alkoxylation products defined by the formula (I) contain, when m$_2$=0, at least two lateral OH functions in the form of at least two units of the type [CH$_2$—CH(CH$_2$OH)—O—].

The organic radical A which is preferably present is preferably a radical of the compound of the formula (II) described below $$A\text{-}OH \quad\quad\quad (II)$$

without the OH group.

Preferred radicals A are those derived from compounds of the group consisting of alcohols, polyetherols and phenols, preferably from allyl alcohol, butanol, octanol, dodecanol, stearyl alcohol, 2-ethylhexanol, cyclohexanol, benzyl alcohol, ethylene glycol, propylene glycol, diethylene, triethylene and polyethylene glycol, 1,2-propylene glycol, dipropylene and polypropylene glycol, 1,4-butanediol, 1,6-hexanediol, trimethylolpropane, glycerol, pentaerythritol, sorbitol and compounds bearing hydroxyl groups and based on natural material. The radicals A preferably have a molar mass of from 33 to 4983 g/mol, in particular from 83 to 4983 g/mol. It can be advantageous for the radicals A to have from 0 to 7, preferably from 1 to 3, hydroxyl groups.

The molar mass M$_w$ of the alkoxylation products of the invention can be varied over a wide range. The molar mass M$_w$ of the alkoxylation products of the invention is preferably from 200 to 50 000 g/mol, more preferably from 800 to 35 000 g/mol and particularly preferably from 1200 to 25 000 g/mol.

The alkoxylation products of the invention having the formula (I) or alkoxylation products of the formula (I) prepared according to the invention are preferably colourless to yellow-orange products which can be clear or opaque.

The alkoxylation products of the invention are preferably obtained by the process of the invention described below.

In the process of the invention for preparing the alkoxylation products of the invention having the formula (I), these can be obtained by means of DMC catalysis using epichlorohydrin and subsequent conversion of the organically bound chlorine into OH groups by means of a substitution reaction or into vinyl ether groups by elimination of HCl.

The compositions comprising the alkoxylation products of the formula (I), which are likewise according to the invention, and mixtures thereof can be prepared by the process of the invention.

The process of the invention for preparing alkoxylation products, in particular the alkoxylation products of the invention comprising hydroxy-functional and/or vinyl ether-functional alkoxylation products, using double metal cyanide catalysts is characterized in that it comprises the following process steps:

Process Step 1:
Reaction of
a) one or more compounds of the formula $$A\text{-}OH$$

where A=hydrogen or an organic radical having at least one carbon atom, with
b) epichlorohydrin and propylene oxide and optionally one or more further alkylene oxides having from 2 to 18 carbon atoms, preferably selected from the group consisting of, for example, ethylene oxide, 1,2-butylene oxide and/or styrene oxide and any mixtures thereof, in the presence of
c) a double metal cyanide catalyst, preferably zinc hexacyanocobaltate(III) at a temperature of from 60 to 250° C., preferably from 90 to 160° C. and particularly preferably from about 100 to 130° C., and a pressure of from 0.02 bar to 100 bar, preferably from 0.05 to 20 bar (absolute), to give an alkoxylation product containing one or more chemically bound chlorine atoms, preferably from 2 to 50, particularly preferably from 2 to 40, very particularly preferably from 3 to 25, chlorine atoms and preferably having a weight average molar mass of from 200 to 50 000 g/mol, preferably from 800 to 35 000 g/mol, particularly preferably from 1200 to 25 000 g/mol, and Process Step 2:
Reaction of
a) the chlorinated alkoxylation product obtained in process step 1)
b) with one or more metal hydroxide and metal alkoxide compounds, preferably with alkali metal and alkaline earth metal hydroxides and alkoxides, particularly preferably with NaOH, KOH, Ca(OH)$_2$, NaOCH$_3$, KOCH$_3$, NaOCH$_2$CH$_3$, KOCH$_2$CH$_3$ or any mixtures thereof,
c) optionally in the presence of water,
d) optionally in the presence of organic solvents such as dimethyl sulphoxide, ketones such as acetone, methyl ethyl ketone, methyl isobutyl ketone, ethers such as tetrahydrofuran or alcohols such as methanol, ethanol, isopropanol, n-propanol, butanol, ethylene glycol,
e) optionally in the presence of one or more phase transfer catalysts such as quaternary ammonium or phosphonium compounds at a temperature of from 30 to 200° C., preferably from 60 to 150° C., with complete or partial elimination of the organically bound chlorine and optionally process step 3:

Optional work-up of the reaction product by
a) neutralization by means of an inorganic or organic acid, preferably a mineral acid, particularly preferably phosphoric acid,
b) distillation of water and/or solvent,
c) removal of chloride salts by phase separation and/or
d) filtration.

Process Step 1:

As starters (process step 1a) for the alkoxylation reaction, it is possible to use all compounds of the formula (II)

$$A\text{-}OH \quad (II)$$

having at least one hydroxyl group and A=hydrogen or an organic radical having at least one carbon atom, preferably an organic radical. For the purposes of the present invention, starter compounds are substances which form the beginning (start) of the polyether or alkoxylation product which is to be prepared and is obtained by molecular addition of alkylene oxides. The starter compound is preferably selected from the group consisting of alcohols, polyetherols and phenols. Preference is given to using a monohydric or polyhydric polyether alcohol and/or monohydric or polyhydric alcohol or any mixture thereof as starter compound containing the group A.

As OH-functional starter compounds A-OH (II), preference is given to using compounds having molar masses of from 50 to 5000 g/mol, in particular from 100 to 5000 g/mol. As OH-functional compounds, use is made of those having from 1 to 8, preferably from 2 to 4, hydroxyl groups. Examples which may be mentioned are allyl alcohol, butanol, octanol, dodecanol, stearyl alcohol, 2-ethylhexanol, cyclohexanol, benzyl alcohol, ethylene glycol, propylene glycol, diethylene, triethylene and polyethylene glycol, 1,2-propylene glycol, dipropylene and polypropylene glycol, 1,4-butanediol, 1,6-hexanediol, trimethylolpropane, glycerol, pentaerythritol, dipentaerythritol, sorbitol, xylitol, threitol, erathritol, mannitol or lactide, isomaltitol or further hydroxyl-bearing compounds which may optionally be based on natural materials.

Where reference is made to natural materials in the context of the present invention, e.g. sorbitol, the reference basically includes all isomers, with preference being given to the isomers which occur in nature, in the case mentioned D-sorbitol.

For the definition of natural materials, reference is made to the "Dictionary of Natural Products", Chapman and Hall/CRC Press, Taylor and Francis Group, e.g. in the online version of 2011: http://dnp.chemnetbase.com/.

Wherever molecules or molecule fragments have one or more stereocentres or can be divided into isomers on the basis of symmetry or can be divided into isomers on the basis of other effects, e.g. restrictive rotation, all possible isomers are included by the present invention.

Preference is given to using low molecular weight polyetherols which have from 1 to 8 hydroxyl groups and weight average molar masses of from 100 to 5000 g/mol and have preferably been prepared by DMC-catalysed alkoxylation as starter compounds. Particularly suitable compounds are polypropylene glycols, polyethylene glycols, poly(ethylene)-co-(propylene) glycols, polybutylene glycols, poly(propylene)-co-(butylene) glycols, poly(butylene)-co-(ethylene) glycols which have at least one OH group. Among these polyalkylene glycols, compounds derived from butanol, allyl alcohol, octanol, decanol, dodecanol, butanediol, hexanediol, glycerol are particularly advantageous. The products of the reaction according to the invention can thus again be used as starter compounds in the process of the invention when higher molar masses are to be achieved; however, in the case of in, being greater than 0 branching takes place since all hydroxyl groups can be alkoxylated. The starters which can be used also include halogenated compounds including polyetherols derived from epichlorohydrin, e.g. polyepichlorohydrin. In the second reaction step with metal hydroxide, the halogens bound to the starter can also be converted into OH groups or unsaturated groups.

Apart from compounds having aliphatic and cycloaliphatic OH groups, any compounds having from 1 to 20 phenolic OH functions are also suitable as compounds of the formula (II). These include, for example, phenol, alkylphenols and arylphenols, bisphenol A and novolaks.

As DMC catalyst, it is possible to use all known DMC catalysts, preferably those comprising zinc and cobalt, particularly preferably those comprising zinc hexacyanocobaltate(III). Preference is given to using the DMC catalysts described in U.S. Pat. No. 5,158,922, US 2003/0119663, WO 01/80994 or in the abovementioned documents. The catalysts can be amorphous or crystalline.

The catalyst concentration in the reaction mixture in process step 1 is preferably from >0 to 2000 wppm (ppm by mass), preferably from 30 to 1500 wppm, based on the total mass of the reaction mixture. The catalyst is preferably introduced only once into the reactor. The amount of catalyst is preferably set so that a sufficient catalytic activity for the process is ensured. The catalyst can be introduced as solid or in the form of a catalyst suspension.

To prepare the chlorine-containing alkoxylation products as intermediates for the alkoxylation products of the invention functionalized with hydroxy groups or C—C double bonds, propylene oxide is always used in addition to epichlorohydrin. In addition, as indicated above, further epoxide compounds, in particular alkylene oxides having from 2 to 18 carbon atoms, preferably ethylene oxide, 1,2-butylene oxide and styrene oxide, can optionally be used. The various individual monomers can be alkoxylated either in succession in a block-like fashion or simultaneously or in admixture. This results in alkoxylation products having the formula (I) in which the units having the indices n, $m_1$, $m_2$ and o are, as desired, present in the chain as random mixtures or in blocks.

The molar ratio of epichlorohydrin to the OH groups of the starter compounds is preferably from 50:1 to 1:1, more preferably from 40:1 to 2:1, particularly preferably from 25:1 to 3:1.

The molar ratio of epichlorohydrin to the other alkylene oxides can be varied within wide limits and is preferably from 1:1000 to 1:0.1, preferably from 1:200 to 1:0.5, particularly preferably from 1:100 to 1:1.5.

The structural units of the formula (I) having the indices n and o are therefore preferably present in a molar excess over the monomer units which are derived from epichlorohydrin and have the indices $m_1$ and $m_2$.

In the first process step of the process of the invention, epichlorohydrin is preferably copolymerized with a molar excess of one or more alkylene oxides in the presence of a DMC catalyst, with random copolymerization being advantageous. The copolymerization of epichlorohydrin with propylene oxide gives chlorinated polypropylene glycols, that with propylene oxide and ethylene oxide gives chlorinated, mixed poly(ethylene)-co-(propylene) glycols, that with propylene oxide and butylene oxide gives chlorinated poly(butylene)-co-(propylene)glycols.

To start the DMC-catalysed reaction, it can be advantageous firstly to activate the catalyst with a portion of alkylene oxide, preferably propylene oxide. After the alkoxylation reaction has started, the copolymerization of epichlorohydrin/alkylene oxide can be commenced. The addition reaction of epichlorohydrin/alkylene oxide can, depending on the intended structure, be interrupted one or more times by the addition reaction of only alkylene oxide. Particular preference is given to further alkylene oxide, preferably propylene oxide, being added on after the introduction of epichlorohydrin/alkylene oxide is complete.

The reaction in process step 1 can be carried out in an inert solvent, for example in order to decrease the viscosity.

The end of the epoxide addition is preferably followed by an after-reaction in order to complete the conversion. The after-reaction can, for example, be carried out by further reaction under reaction conditions without addition of starter materials. The after-reaction is preferably carried out with mixing of the reaction mixture, in particular with stirring. The DMC catalyst usually remains in the reaction mixture or in the chlorine-containing alkoxylation products of process step 1. Unreacted epoxides and possibly further volatile constituents can be removed immediately after process step 1 or else after process step 2, e.g. by vacuum steam stripping or gas stripping or other deodorization methods.

The chlorine-containing alkoxylation products contain monomer units of the type [—$CH_2$—$CH(CH_2Cl)$—O—] and have, depending on the molar mass, a low to high viscosity. Products which have a high molar mass and are rich in units which are chemically incorporated by ring opening of ethylene oxide and/or epichlorohydrin tend to crystallize on cooling and may be opaque. A quantitative analysis to determine the chlorine content in the alkoxylation product can be carried out, for example, by means of $^{13}C$ NMR. spectroscopy. GPC measurements allow the polydispersity and average molar masses to be determined.

As reactors for the alkoxylation in the first process step, it is in principle possible to use all suitable types of reactor which allow the reaction and the heat evolved thereby to be controlled. The first process step can be carried out continuously, semicontinuously or batchwise in a way known to process engineers. Apart from stirred tank reactors, it is also possible to use jet loop reactors having a gas phase and external heat exchangers, as described, for example, in EP-A-0 419 419 (U.S. Pat. No. 5,159,092), or internal heat-exchange tubes, as described in WO 01/062826 (US 2003/0004378). In addition, loop reactors which are free of a gas phase can be used Process Step 2:

In the second process step, the desired functional copolymers are formed by reaction with metal hydroxides. The reaction conditions, e.g. temperature, use of solvent and amount of metal hydroxide used, influence the ratio of the monomer units having the indices $m_1$ and $m_2$ to one another. Thus, alkoxylation products having a high hydroxy functionality or a high C—C double bond functionality and/or mixed OH/vinyl-functional products can be obtained as desired.

The alkoxylation products containing chemically bound chlorine which are obtained in process step 1) are converted in the second process step of the process of the invention into the functional alkoxylation products or polyethers of the invention having the formula (I) by reaction with one or more hydroxide compounds with elimination of the chlorine bound to the carbon and with formation of the corresponding chloride salts.

Suitable hydroxides are in principle all metal hydroxides, preferably alkali metal and alkaline earth metal hydroxides such as NaOH, KOH or $Ca(OH)_2$ and mixtures thereof. The hydroxides can, as desired, be used in solid form, as aqueous solutions or dispersions or, for example, as solutions in alcohols such as ethanol or methanol. Aqueous sodium hydroxide solution and potassium hydroxide solution and also ethanolic or methanolic solutions of NaOH or KOH or mixtures thereof are particularly suitable. Furthermore, metal alkoxides, preferably alkali metal and alkaline earth metal alkoxides such as $NaOCH_3$, $KOCH_3$, $NaOCH_2CH_3$, $KOCH_2CH_3$, in solid form or as alcoholic solutions, are also suitable. The concentration of the solutions can in principle be chosen freely, but solutions having a concentration of from 10 to 50% by weight are preferred. It is advantageous to carry out the second process step under inert protective gas such as nitrogen or argon.

The amount of hydroxide or alkoxide used depends on the chlorine content of the epichlorohydrin alkoxylation product or epichlorohydrin polyether. To achieve a rapid and quantitative conversion, it is advantageous to use the hydroxide or the alkoxide in an equimolar amount or in a molar excess based on the bound chlorine in the alkoxylation product. Thus, preference is given to using from 1.0 to 10 mol of hydroxide or alkoxide, preferably from 1.01 mol to 5 mol of hydroxide or alkoxide, particularly preferably from 1.1 mol to 3 mol of hydroxide or alkoxide, per 1 mol of chlorine.

Alkoxylation products or polyethers of the formula (I) in which the chlorine has been only partially eliminated can be produced by addition of smaller amounts of hydroxide or alkoxide or by premature termination of the reaction in the second process step. Some of the radicals R are then $CH_2Cl$.

The second process step can be carried out with or without addition of solvent. Suitable solvents are, in particular, polar or protic compounds or mixtures thereof matched to the solubility of the polyether and the miscibility with the hydroxide. Solvents which can be used include dimethyl sulphoxide, ketones such as acetone, methyl ethyl ketone, methyl isobutyl ketone, ethers such as tetrahydrofuran or alcohols such as ethanol, isopropanol, n-propanol, butanol, ethylene glycol.

The use of water as solvent is also possible in the second process step. The alkoxylation product can be present therein either in dissolved form or in dispersed form. The proportion of solvent or water in the mixture with the alkoxylation product in the second process step is preferably from 5 to 80% by weight, preferably from 10 to 60% by weight.

It is possible to add phase transfer catalysts in order to accelerate the reaction when carrying out process step 2, in particular the substitution or dehydrohalogenation reaction, preferably when it is carried out in an aqueous medium. Suitable phase transfer catalysts are known to those skilled in the art. Preferred phase transfer catalysts are, for example, quaternary ammonium and phosphonium compounds.

The second process step can be carried out at temperatures of from 30 to 200° C., preferably from 60 to 150° C. When using solvents, the reaction can be carried out at the reflux temperature of the boiling solvent. A further option is to carry out the addition of hydroxide or alkoxide in the autoclave in which the alkoxylation (process step 1) was previously carried out. This variant allows the elimination of chlorine to be carried out more quickly at higher temperatures under superatmospheric pressure.

The order of addition of the reactants in the second process step is immaterial. It is possible both to place the chlorinated alkoxylation products in the reaction vessel and add the respective hydroxide or alkoxide while stirring and, conversely, to charge the hydroxide or alkoxide initially in a stirrable, i.e. dissolved or dispersed, form and then add the epichlorohydrin polyether or the epichlorohydrin alkoxylation product. The addition of the second reactant can occur either continuously in a feed stream process or in portions.

If an organic solvent or water is used, this can initially be placed together with the first reaction component in the reactor. As an alternative, the solvent or water can also be introduced continuously or discontinuously with the second reaction component. In this case, it is advantageous to add the second reactant in dissolved form. The addition of the second reactant can be carried out within a few minutes or else slowly over a period of, for example, a number of hours. A subsequent sufficiently long stirring time (after-reaction time) should be carried out to ensure that the elimination of chlorine is complete. The duration of the after-reaction can be determined by means of simple preliminary tests. The addition and after-reaction preferably take a total time of from about 2 to 8 hours.

The chloride of the respective metal hydroxide or metal alkoxide is formed during the reaction in process step 2. The metal chlorides such as NaCl or KCl are only partially soluble in the reaction mixture and partly precipitate as solids.

In a preferred embodiment of the process of the invention, the chlorinated polyether or the chlorinated alkoxylation product is initially charged and the metal hydroxide or metal alkoxide is added over a period of from 30 minutes to 2 hours while stirring. After an after-reaction time of about 4 hours, complete conversion has been achieved. The analysis for vinyl ether and residual chlorine bound to the polyether or alkoxylation product can be carried out by means of $^{13}$C—NMR analysis.

A reaction mixture (a composition) comprising the alkoxylation product of the formula (I) is obtained as product of process step 2.

Optional Process Step 3:

The solvent or water present in the reaction mixture can be removed by distillation, preferably under reduced pressure, either during the after-reaction or after the after-reaction is complete. It is advantageous to carry out the distillation under reduced pressure at the reaction temperature of process step 2.

To neutralize the hydroxide excess after the reaction is complete, it is in principle possible to use all adds. Preference is given to aqueous mineral adds, in particular aqueous phosphoric acid. Acid is preferably added in such an amount that an approximately neutral pH of from 6 to 8 is established in the reaction mixture. The neutralization can be carried out as desired before or after any solvent or water distillation carried out.

There are a number of possible ways of removing chloride salts from the reaction mixture. Thus, the preferably water-free reaction mixture comprising the alkoxylation product of the formula (I) can, optionally dissolved in a solvent, be freed of salts by filtration.

If required, part of the salts can be removed beforehand by means of a phase separation. For this purpose, the reaction mixture comprising the alkoxylation product of the formula (I) is admixed with water and stirred in order to dissolve undissolved chloride. The brine formed is separated off from the organic phase after a certain settling time. The organic phase which still contains residual salt can subsequently be, for example, distilled under water-free conditions and subsequently filtered.

The type of work-up which is most advantageous depends in each case on the available technical possibilities in terms of apparatus and on the specific properties of the alkoxylation product of the formula (I), for example its hydrophilicity, density, viscosity or solubility.

As a result of the use of DMC catalysis in the first process step, the process of the invention provides a route to hydroxyl-functional alkoxylation products or polyethers which have a higher molecular weight than the products disclosed, for example, in U.S. Pat. No. 3,578,719, GB 1267259 and GB 1516195 and whose [CH$_2$CH(CH$_2$OH)—O—] groups are also not simply juxtaposed in blocks. Thus, the products according to the invention are polyalkylene glycols in whose polymer chain the [—CH$_2$—CH(CH$_2$OH)—O—] units are scattered among oxypropylene and possibly further oxyalkylene units.

The alkoxylation products of the formula (I) can be used as intermediates for a further chemical reaction or directly for producing compositions containing these alkoxylation products.

The examples below illustrate the present invention by way of example without restricting the invention, whose scope is defined by the total description and the claims, to the embodiments mentioned in the examples.

EXAMPLES

Experimental Part

GPC Measurement

GPC measurements to determine the polydispersity and average molar masses $M_w$ were carried out under the following measurement conditions: column combination SDV 1000/10000 Å (length 65 cm), temperature 30° C., THF as mobile phase, flow rate 1 ml/min, sample concentration 10 g/l, RI detector, evaluation against polypropylene glycol standard.

Determination of the Content of Chlorine and Vinyl Groups:

The determination of the content of chlorine and vinyl groups was carried out by means of $^{13}$C-NMR spectroscopy. A Bruker Avance 400 NMR spectrometer was used. The samples were for this purpose dissolved in CDCl$_3$.

Determination of the OH Number:

Hydroxyl numbers were determined by the method DGF C-V 17 a (53) of the German Society for Fat Science. Here, the samples were acetylated by means of acetic anhydride in the presence of pyridine and the consumption of acetic anhydride was determined by titration with 0.5 N potassium hydroxide solution in ethanol against phenolphthalein.

Example A:

Preparation of Epichlorohydrin Alkoxylation Products (Intermediates) by the Process of the Invention Example A1

Intermediate 1

360.5 g of poly(oxypropylene) monobutyl ether (mass average molar mass $M_w$=385 g/mol) as starter and 2.25 g of zinc hexacyanocobaltate DMC catalyst were placed in a 3 litre autoclave and heated to 130° C. while stirring. The reactor was evacuated to an internal pressure of 30 mbar in order to remove any volatile constituents present by distillation. To activate the DMC catalyst, a portion of 75 g of propylene oxide was added. After the reaction had started and the internal pressure had dropped, a further 200 g of propylene oxide were firstly introduced while cooling. Subsequently, 1747 g of propylene oxide and 348 g of epichlorohydrin in admixture were introduced at 130° C. and an internal reactor pressure of max. 2.7 bar over a period of 60 minutes under the same conditions. This was followed by a 30 minute after-reaction at 130° C., during the course of which the internal pressure in the reactor dropped to 0.5 bar. Finally, a further 275 g of propylene oxide were added as end block at 130° C. After a renewed after-reaction under the same conditions, a degassing step was carried out. Here, volatile components such as residual propylene oxide and epichlorohydrin were distilled off at 130° C. under reduced pressure. The virtually colourless, low-viscosity chlorine-containing alkoxylation product was cooled to below 90° C. and drained from the reactor. The product had, according to GPC, a weight average molar mass of 3033 g/mol, a polydispersity $M_w/M_n$ of 1.18 and, according to $^{13}C$-NMR. analysis, contained 4 mol of Cl per molecule.

Example A2

Intermediate 2

337.3 g of poly(oxypropylene) monobutyl ether (mass average molar mass $M_w$=380 g/mol) as starter and 2.25 g of zinc hexacyanocobaltate DMC catalyst were placed in a 3 litre autoclave and heated to 130° C. while stirring. The reactor was evacuated to an internal pressure of 30 mbar in order to remove any volatile constituents present by distillation. To activate the DMC catalyst, a portion of 70 g of propylene oxide was added. After the reaction had started and the internal pressure had dropped, a further 189 g of propylene oxide were firstly introduced while cooling. Subsequently; 1655 g of propylene oxide and 494 g of epichlorohydrin in admixture were introduced at 130° C. and an internal reactor pressure of max. 2.9 bar over a period of 90 minutes under the same conditions. This was followed by a 30 minute after-reaction at 130° C. Finally, a further 259 g of propylene oxide were added as end block at 130° C. After a renewed after-reaction, a degassing step at 130° C. under reduced pressure was carried out. The virtually colourless, low-viscosity chlorine-containing alkoxylation product was cooled to below 90° C. and drained from the reactor. The product had, according to GPC, a weight average molar mass of 3576 g/mol, a polydispersity $M_w/M_n$ of 1.29 and, according to $^{13}C$-NMR. analysis, contained 5.8 mol of Cl per molecule.

Example A3

Intermediate 3

190 g of polypropylene glycol (mass average molar mass $M_w$=700 g/mol) as starter and 1.25 g of zinc hexacyanocobaltate DMC catalyst were placed in a 3 litre autoclave and heated to 130° C. while stirring. The reactor was evacuated to an internal pressure of 30 mbar in order to remove any volatile constituents present by distillation. To activate the DMC catalyst, a portion of 35 g of propylene oxide was added. After the reaction had started and the internal pressure had dropped, a further 140 g of propylene oxide were firstly introduced while cooling Subsequently, 1312 g of propylene oxide and 152 g of epichlorohydrin in admixture were introduced at 130° C. and an internal reactor pressure of max. 3 bar over a period of 75 minutes under the same conditions. This was followed by a 30 minute after-reaction at 130° C. during the course of which the internal pressure in the reactor dropped to 0.5 bar. Finally, a further 75 g of propylene oxide were added as end block at 130° C. After a renewed after-reaction under the same conditions, a degassing step was carried out Here, volatile components such as residual propylene oxide and epichlorohydrin were distilled off at 130° C. under reduced pressure. The virtually colorless chlorine-containing alkoxylation product was cooled to below 90° C. and drained from the reactor. The product had, according to GPC, a weight average molar mass of 6940 g/mol, a polydispersity $M_w/M_n$ of 1.21 and, according to $^{13}C$-NMR analysis, contained 6 mol of Cl per molecule.

Example B:

Preparation of the Alkoxylation Products of the Invention by the Process of the Invention

Example B1

A glass flask equipped with stirrer and distillation facility was made inert by means of nitrogen and 300.0 g of intermediate 2 were placed therein and heated to 115° C. Over a period of 50 minutes, 113.0 g of aqueous potassium hydroxide solution (45% by weight) were continuously added dropwise while water was at the same time removed from the reaction mixture by distillation under reduced pressure at <50 mbar. The mixture was stirred at 115° C. with further distillation at about 20 mbar for 4 hours. This gave a readily stirrable mixture of alkoxylation product and salt. The alkaline reaction mixture was cooled to 95° C. and neutralized by means of 30% strength by weight aqueous phosphoric acid. Further water was added until all the salt had dissolved and the mixture was transferred to a separating funnel. The lower brine phase was separated off after a sufficient settlement time, and the remaining polyether phase was returned to a glass flask having a distillation attachment and freed of residual water by vacuum distillation at max. 130° C. Finally, precipitated salt residues were filtered off hot from the turbid alkoxylation product at about 80° C. The final product was yellowish, slightly turbid and had a low viscosity. According to the $^{13}C$-NMR-spectrum, it contained an average of 4.5 vinyl groups per molecule and virtually no residues of organically bound chlorine.

Example B2

The experimental procedure described in Example B1 was repeated with the difference that 250.0 g of the intermediate 2 were reacted with a reduced amount of 55.4 g of aqueous potassium hydroxide solution (45%). The final product was likewise yellowish, had a low viscosity and according to the $^{13}C$ spectrum had an average of about 2.8 vinyl groups and about 3 mol of bound chlorine per molecule.

Example B3

A glass flask equipped with a stirrer was made inert by means of nitrogen and 751.8 g of the intermediate 2 was placed therein and heated to 90° C. Over a period of 90 minutes, 282.9 g of aqueous potassium hydroxide solution (45% by weight) were continuously added dropwise. Over a period of 4 hours, the temperature was increased to 119° C. and the pressure was reduced stepwise to 20 mbar by means of a vacuum pump. Water was removed by distillation to form a readily stirrable mixture of alkoxylation product and salt. The alkaline reaction mixture was neutralized by means of 30% strength by weight aqueous phosphoric acid at 95° C. Further water was added until all salt had dissolved and the mixture was transferred to a separating funnel. The lower brine phase was separated off after settling and the remaining polyether phase was returned to a glass flask having a distillation attachment and distilled to dryness at max. 130° C. by vacuum distillation. Finally, salt residues were filtered off at about 80° C. The final product was yellowish, had a low viscosity and, according to the $^{13}C$-NMR spectrum, had an average of 0.5 vinyl groups per molecule and virtually no residues of organically bound chlorine. The OH number was 66 mg KOH/g.

Example B4

The experimental procedure described in Example B3 was repeated with the difference that 300.0 g of the intermediate 2 and 72.4 g of aqueous sodium hydroxide solution (50% by weight) were used The final product was likewise yellow; turbid, had a low viscosity and, according to the $^{13}$C-NMR spectrum, had an average of about 2.5 vinyl groups per molecule and virtually no residues of bound chlorine. The OH number was 92 mg KOH/g.

Example B5

A glass flask equipped with stirrer and reflux condenser was made inert by means of nitrogen and 200 g of the intermediate 1 and 100 g of ethanol were placed therein, dissolved and heated to reflux temperature, 62.3 g of aqueous potassium hydroxide solution (45% by weight) were continuously added dropwise over a period of 30 minutes. After an after-reaction time of 2 hours 15 minutes, ethanol and water were distilled off at an increasing temperature up to 120° C. The readily stirrable alkaline mixture was neutralized by means of 30% strength by weight aqueous phosphoric acid at 80° C. Further water was added until all salts are dissolved. In a separating funnel, the lower brine phase was separated off after a sufficient settling time and the polyether phase was taken up in 170 g of methyl isobutyl ketone. Salt residues were removed by addition of water in an amount sufficient to dissolve salt present as solid and renewed phase separation. The solution was freed of methyl isobutyl ketone and residual water by vacuum distillation at max. 130° C. in a glass flask with distillation attachment The alkoxylation product was filtered off hot at about 80° C. The final product was yellowish, had a low viscosity and, according to the $^{13}$C-NMR spectrum, had an average of 4 vinyl groups per molecule and no residues of organically bound chlorine,

Example B6

A glass flask equipped with stirrer and distillation facility was made inert by means of nitrogen and 347 g of the intermediate 3 were placed therein and heated to 115° C. Over a period of 35 minutes, 23.1 g of solid potassium methoxide was added in 4 portions while methanol was at the same time removed from the reaction mixture by distillation under reduced pressure at <50 mbar. The mixture was stirred at 115° C. with further distillation at about 20 mbar for 2.5 hours. This gave a readily stirrable mixture of product and salt. The alkaline reaction mixture was cooled to 85° C. and neutralized by means of 30% strength by weight aqueous phosphoric acid. Further water was added until all salts had dissolved and the mixture was transferred to a separating funnel. The lower brine phase was separated off after a sufficient settling time and the remaining polyether phase was returned to a glass flask with distillation attachment and freed of residual water by vacuum distillation at max. 130° C. Finally, precipitated salt residues were filtered off hot from the turbid alkoxylation product at about 80° C. The final product was yellowish and slightly turbid. According to the $^{13}$C-NMR spectrum, it contained an average of 5.8 vinyl groups per molecule and virtually no residues of organically bound chlorine.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A compound which includes:
a structural element [—$CH_2$—CH($CH_2OH$)—O—] and/or a structural element [—$CH_2$—C(=$CH_2$)—O—];
wherein the compound has the formula (I):

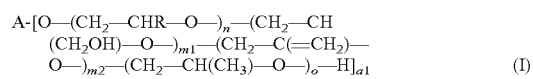

where a1 is from 1 to 8;
where A is either hydrogen, or a radical, of an organic starter compound, having at least one carbon atom;
where the radicals R are each, independently of one another, either hydrogen, $CH_2$—Cl, an alkyl group having 2-18 carbon atoms, or an aromatic radical;
where (a1×m1) is from 0 to 50;
where (a1×m2) is from 0 to 50;
where (a1×n) is from 0 to 200;
where (a1×o) is from 1 to 1000;
where the sum (a1×(m1+m2)) is from 2 to 50; and
where (a1×m1) is 2 or greater than 2 when (a1×m2) is zero.

2. A compound according to claim 1;
wherein the molar proportion of the units having the index $m_2$ is from 20 to 100% based on the sum of the units having the indices $m_1$ and $m_2$, which adds up to 100%.

3. A compound according to claim 2;
wherein the molar proportion of the units having the index $m_2$ is from 30 to 90% based on the sum of the units having the indices $m_1$, and $m_2$, which adds up to 100%.

4. A compound according to claim 1;
wherein the compounds of the formula (I) have an oxypropylene group (index o) as last monomer unit.

5. A compound according to claim 1;
wherein the radical A is a radical of a monohydric or polyhydric polyether alcohol and/or a radical of a monohydric or polyhydric alcohol.

6. A compound according to claim 1;
wherein the compound has a weight average molar mass of from 200 to 50000 g/mol.

7. A process for preparing compounds comprising the structural element [—$CH_2$—CH($CH_2OH$)—O—] and/or the structural element [—$CH_2$—C(=$CH_2$)—O—] using double metal cyanide catalysts, the process comprising:
process step 1, which includes:
reacting:
(a) one or more compounds of the formula (II):

where A=hydrogen or an organic radical having at least one carbon atom;
with:
(b) epichlorohydrin and propylene oxide and optionally one or more further alkylene oxides having from 2 to 18 carbon atoms;
in the presence of:
(c) a double metal cyanide catalyst ;
at a temperature of from 60 to 250° C. and a pressure of from 0.02 bar to 100 bar (absolute) to give an alkoxylation product having one or more chemically bound chlorine atoms; and
process step (2), which includes:
reacting the chlorinated alkoxylation product obtained in process step 1), with one or more metal hydroxide or metal alkoxide compounds, at a temperature of 30-200° C. with complete or partial elimination of the organically bound chlorine;

wherein the reacting optionally takes place in the presence of water;

wherein the reacting optionally takes place in the presence of organic solvents; and wherein the reacting optionally takes place in the presence of phase transfer catalysts;

wherein the process optionally further comprises process (3), which includes:

work-up of the reaction product by at least one of:
  (a) neutralization by means of an inorganic or organic acid;
  (b) distillation of water and/or solvent;
  (c) removal of chloride salts by phase separation; and
  (d) filtration.

8. The process according to claim 7;

wherein at least one of sodium hydroxide, potassium hydroxide, ethanolic or methanolic solutions of NaOH or KOH, and mixtures thereof, is used as metal hydroxide; and/or wherein at least one of sodium methoxide, potassium methoxide, methanolic solutions, and mixtures thereof; is used as metal alkoxide.

9. The process according to claim 8;

wherein at least one of a sodium hydroxide solution, a potassium hydroxide solution, a sodium methoxide solution, a potassium methoxide solution, and mixtures thereof, having a concentration of from 10 to 50% by weight is used.

10. The process according to claim 7;

wherein the hydroxide and/or alkoxide is used in an equimolar amount or a molar excess based on the bound chlorine in the alkoxylation product.

11. The process according to claim 10;

wherein from 1.0 mol to 3 mol of hydroxide or alkoxide is used per 1 mol of chlorine.

12. The process according to claim 7;

a compound according to claim 1 is prepared.

13. The process according to claim 7;

wherein a composition is obtained which comprises a compound including:

a structural element [—$CH_2$—$CH(CH_2OH)$—O] and/or a structural element [—$CH_2$—$C(=CH_2)$—O—];

wherein the compound has the formula (I):

$$A\text{-}[O\text{---}(CH_2\text{---}CHR\text{---}O\text{---})_n\text{---}(CH_2\text{---}CH(CH_2OH)\text{---}O\text{---})_{m1}\text{---}(CH_2\text{---}C(=CH_2)\text{---}O\text{---})_{m2}\text{---}(CH_2\text{---}CH(CH_3)\text{---}O\text{---})_o\text{---}H]_{a1} \quad (I)$$

where a1 is from 1 to 8;

where A is either hydrogen or a radical of an organic starter compound, having at least one carbon atom;

where the radicals R are each, independently of one another, either hydrogen, $CH_2$—Cl, an alkyl group having 2-18 carbon atoms, or an aromatic radical;

where (a1×m1) is from 0 to 50;

where (a1×m2) is from 0 to 50;

where (a1×n) is from 0 to 200;

where (a1×o) is from 1 to 1000;

where the sum (a1×(m1+m2)) is from 2 to 50; and where (a1×m1) is 2 or greater than 2 when (a1×m2) is zero.

14. A composition which includes a compound according to claim 1.

* * * * *